United States Patent [19]
Cromie

[11] 3,709,526
[45] Jan. 9, 1973

[54] MULTIPLE PIECE CLAMP FOR CONNECTING TUBING

[75] Inventor: Harry W. Cromie, Pittsburgh, Pa.

[73] Assignee: Baxter Laboratories, Inc., Morton Grove, Ill.

[22] Filed: March 1, 1971

[21] Appl. No.: 120,014

[52] U.S. Cl. .................................... 285/73, 285/359
[51] Int. Cl. ............................................. B60d 1/08
[58] Field of Search .......... 285/73, 74, 359, 387, 395, 285/373, 419

[56] References Cited

UNITED STATES PATENTS

| 3,129,959 | 4/1964 | Kuzma | 285/74 |
| 3,498,642 | 3/1970 | Berger | 285/358 X |
| 2,816,779 | 12/1957 | Jensen | 285/74 |
| 3,185,503 | 5/1965 | Angle | 285/74 |
| 3,428,337 | 2/1969 | Read | 285/387 X |

Primary Examiner—Dave W. Arola
Attorney—W. Garretson Ellis

[57] ABSTRACT

A clamp for securely holding ends of tubing together in end-to-end relationship is disclosed, in which the tubing so held carries a flange about its end. The clamp comprises four separable sections of identical shape, in which each section has means for locking together with another section to form two identical clamp halves. Each clamp half defines a bore to receive and hold tubing. The bore has an enlarged portion to receive and hold the tuning flange. Each clamp half also defines arms and slots positioned so that the arms of each clamp half are capable of engaging the slots of the other clamp half to secure the two halves together with the tuning ends mounted in each clamp half being secured together in end-to-end relationship.

12 Claims, 7 Drawing Figures

PATENTED JAN 9 1973  3,709,526

Inventor
Harry W. Cromie
By W. Garrettson Ellis
Atty.

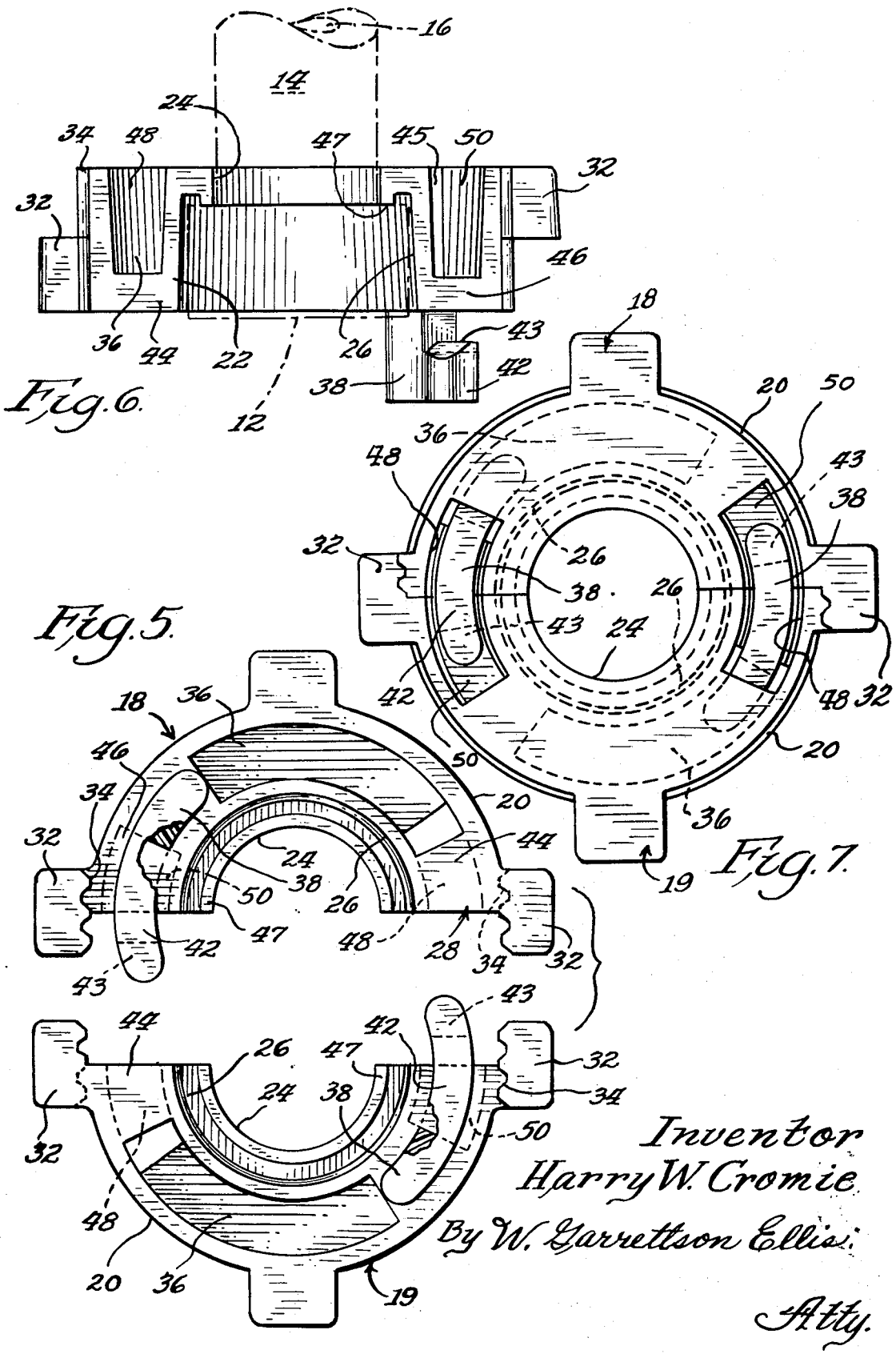

MULTIPLE PIECE CLAMP FOR CONNECTING TUBING

BACKGROUND OF THE INVENTION

There is a substantial need for simple yet reliable clamps for holding ends of tubing together in end-to-end relationship, to form a smooth, continuous bore inside of the tubing between the tubing ends. This requirement becomes particularly important in the handling of blood, since blood tends to clot when it flows over rough surfaces.

Similarly, simple, disposable clamps of very high reliability are needed to connect blood conduits used in conjunction with artificial kidneys, heart-lung machines, organ perfusion apparatus, and the like. Any failure of the clamp can result in a catastrophic blood loss.

The clamp of this invention is made from four identical pieces which can be readily assembled and disassembled by the user, and is very secure against accidental separation of the two conduit ends, once the clamp is emplaced. The individual separable sections of the clamp, being of identical shape, are completely interchangeable, so that a large number of clamps of this invention can be readily assembled from a box full of identical clamp sections, without any need to search for separate and different clamp parts. Furthermore, the clamp can be assembled about the tubing ends while the opposite ends of the tubing remain secured, as, for example, to a blood vessel and a heart-lung machine respectively.

Also, the clamp of this invention is capable of holding flanged elastomeric tubing together with pressure fit, so that blood or other fluid passes through the clamp without encountering significant surface roughness or any other material except the tubing material, which can desirably be made of silicone rubber.

The clamp sections of this invention used to assemble the clamp described herein can be simply and inexpensively molded from plastic to provide disposable clamps. The advantage of disposability simplifies the sterilization problems in the operating room.

DESCRIPTION OF THE INVENTION

In accordance with this invention, a clamp for securely holding ends of tubing together in end-to-end relationship to form a continuous bore through the tubing ends is disclosed. The tube which is so held by the clamp typically carries a flange about its bore.

The clamp typically comprises four separable sections of identical shape, each section having means for locking together with another section to form two identical clamp halves. Each clamp half defines a bore to receive and hold the tubing, the bore having an enlarged portion to receive and hold the flange of each tubing. Each clamp section defines an arm and a slot, so that each clamp half defines arms and slots positioned so that the arms of each clamp half can engage the slots of the other clamp half, to secure the clamp halves together with the tubing ends mounted in each clamp half being secured together in end-to-end relationship.

Referring to the drawings:

FIG. 5 is plan view of a pair of the same clamp sections, with portions broken away, preparatory to assembling into a clamp half.

FIG. 6 is a front elevational view of the same clamp section with a flanged tubing end placed in the bore portion defined by said clamp section.

FIG. 7 is a plan view of the assembled clamp of FIG. 1, taken along the axis of tubing held therein, with the tubing removed for purposes of clarification.

Figure 1:
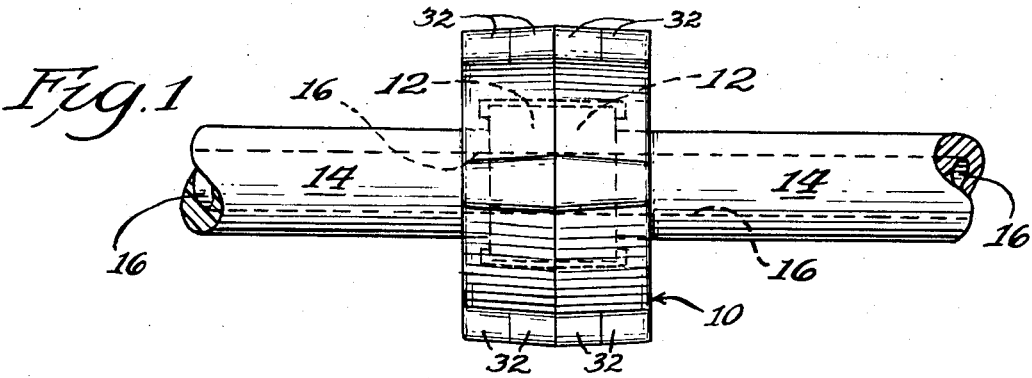
FIG. 1 is an elevational view of one embodiment of the clamp of this invention, shown to be holding flanged tubing ends tightly together in end-to-end relationship.
Figure 3:
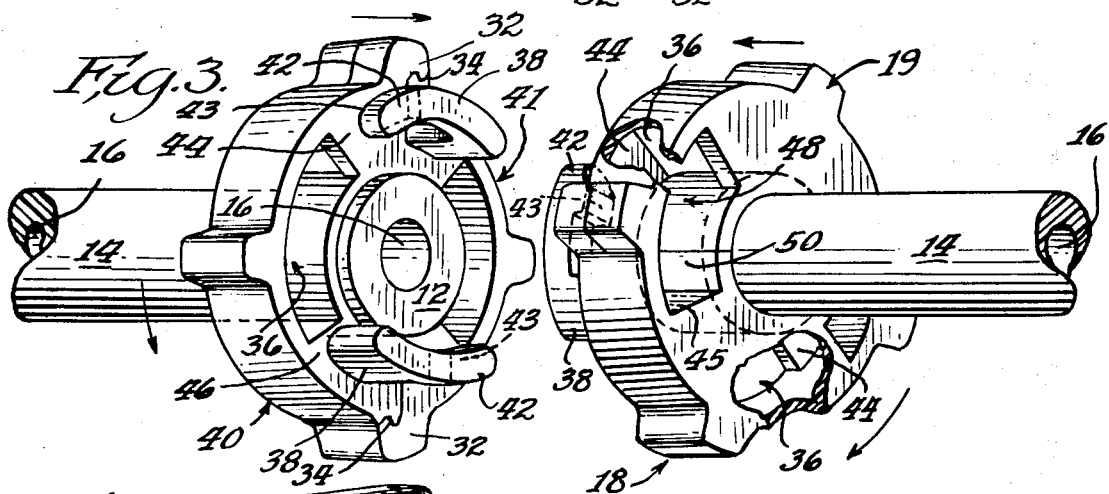
FIG. 3 shows two clamp halves made of clamp sections of FIG. 2, with tubing mounted therein, with portions broken away for purposes of clarity, preparatory to securance together to form the assembled clamp.
Figure 2:
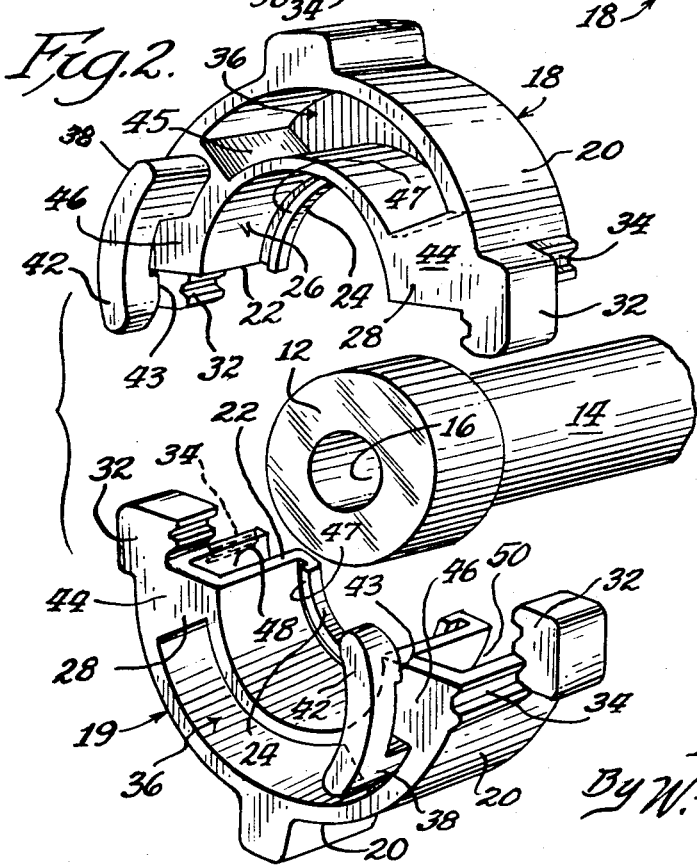
FIG. 2 shows two clamp sections of the clamp shown in FIG. 1, and the end of a flanged tube, the elements being positioned preparatory to assembly into a clamp half with the tubing secured therein.
Figure 4:
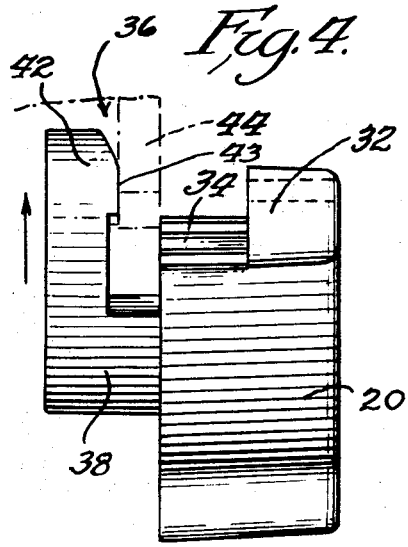
FIG. 4 is a side elevational view of a clamp section shown in FIG. 2, showing details of the fastening relationship between clamp halves.

Referring to FIG. 1, a clamp 10 is shown which firmly holds the flanged ends 12 of tubing section 14 together in sealing, abutting, end-to-end relationship. By the use of clamp 10, a continuous bore 16 is formed between the tubing ends so that blood or other fluids can pass between the junction of the joined tubing sections without direct contact with the clamp material and without any significant discontinuity in the wall of bore 16.

Referring also to FIGS. 2 through 7, first and second clamp sections 18, 19 (FIG. 2) are shown in position just prior to being locked together to form a clamp half which receives and holds tubing 14. Each clamp section defines a body 20, which body defines on a first side 22 thereof a portion of a bore 24 to receive the tubing. Bore portion 24 has an enlarged portion 26 to receive flange 12. Enlarged portion 26 of bore 24 extends to an adjacent side 28 of the body 20.

Means are located on first side 22 of each clamp section 18, 19 for releasable locking together with another clamp section to define a clamp half with a complete bore for receiving and holding the tubing 14 and flange 12. The releasable locking means disclosed herein comprises a pair of claws 32 and grooves 34. Each groove 34 of section 18 is positioned to mate with a claw 32 of the facing second clamp section 19, and each claw 32 of section 18 is positioned to mate with a groove 34 of second clamp section 19, to provide a snap-locking action for releasable securance. It will be noted that the positions of each claw 32 and groove 34 are asymmetrical, being reversed on opposite ends of each clamp section to permit such mating with a corresponding clamp section.

Each clamp section also defines a slot 36 opening through adjacent side 28, and an arm 38 extending from adjacent side 28, and positioned asymmetrically on said clamp section. Each arm and slot are disposed circumferentially about the longitudinal axis of the bore which is formed when the clamp sections are assembled together into clamp halves, to permit securance of clamp section 18 to a third clamp section 40 (see FIG. 3) and section 19 to section 41, for releasable securance thereto. Arm 38 of clamp section 18 fits into slot 36 of clamp section 40 while arm 38 of clamp section 40 fits into slot 36 of section 18, and the same relationship holds for clamp sections 19 and 41. The respective clamp halves are then rotated so that circumferentially extending portions 42 of each arm 38 can slide under an open shelf 44 under which slot 36 extends, to receive portion 42 and hold respective clamp halves together. Slot 36 has an open end under shelf 44 opening on first side 22 to permit portion 42 of arm 38 to pass out said end, while the other end of slot 36 is blocked by wall 45.

Shelf 44 (see particularly FIG. 6) is fabricated to be a few thousandths of an inch greater thickness than corresponding shelf 46 located adjacent arm 38 of the same clamp section. This permits detent means 43 (FIG. 2) on circumferentially extending portion 42 to catch on the small step defined by the differential thickness between shelves 44 and 46 of separate clamp sections, when brought together to form a clamp half in the manner of FIG. 2. Thus, two clamp halves can be rotated together into reversible snap-locking relationship with detent means 43 engaging the small step formed between the respective shelves 44, 46 which face each other in mating clamp sections 18, 19.

Flange 47 (FIG. 6) serves as a sealing ring pressing against the back of flanged end 12. Rear slots 48, 50 are open on the side facing the tubing 14 (FIG. 6) to economize on plastic material and to simplify the molding of the clamp sections. Slot 48 communicates with slot 36, while slot 50 is isolated from slot 36 by wall 45. As shown in FIG. 7, each slot 50 is proportioned to receive that portion of arm 38 which passes out of the end of slot 36, 48 of the mating clamp section which is engaged to form a clamp half.

The above disclosure has been for illustrative purposes only, and is not to be construed as limiting the invention defined in the claims below.

That which is claimed is:

1. A clamp for securely holding ends of tubing having flanges at their ends together in end-to-end relationship to form a continuous bore through said tubing ends, which clamp comprises:
   four separable sections of identical shape, each said section having means releasably locking together with another section to form two identical clamp halves, each clamp half defining a bore to receive and hold said tubing and flange;
   each clamp half defining arms and slot-defining walls positioned so that the arms of each clamp half engage slot-defining walls of the other clamp half to secure said clamp halves together with tubing ends held in each clamp half being secured together in end-to-end relationship.

2. The clamp of claim 1 in which said arms and slot-defining walls extend circumferentially about the longitudinal axis of said bore, said arms being disposed axially forward of their associated clamp half, and in which said slot-defining walls include a shelf overlying a portion of each said slot, to permit securance of said clamp halves together by relative rotation of the clamp halves about said axis, whereby each arm in a slot is rotated into securing engagement with a shelf.

3. A separable clamp section for assembling into a clamp for securely holding ends of tubing having flanges at their ends together in end-to-end relationship to form a continuous bore through said tubing ends, which clamp section comprises:
   a body which defines on a first side thereof a portion of a bore to receive said tubing, said bore portion having an enlarged portion to receive a tubing flange, said enlarged portion extending to an adjacent side of said body;
   means located adjacent said first side and adjacent respective ends thereof for releasable locking together with a second clamp section of identical shape to define a clamp half with a complete bore for receiving and holding said tubing and flange therein, said releasable locking means adjacent respective ends thereof being in asymmetrical arrangement to permit said locking together; and
   walls defining a slot in said adjacent side of the body, and an arm extending from said adjacent side, each positioned asymmetrically for engagement with an arm and a slot wall respectively of a third clamp section of identical shape for releasable securance thereto.

4. The clamp section of claim 3 in which said arm and walls defining said slot extend circumferentially about the longitudinal axis of said bore, said arm being disposed axially forward of its associated clamp section, to permit securance of said clamp section to the third clamp section by relative rotation between the clamp sections about said axis.

5. The clamp section of claim 4 in which said slot defining walls include a shelf overlying a portion of said slot, and said arm has a circumferentially extending portion proportioned to fit in a slot of said third clamp section and by relative rotation to pass under a shelf overlying a slot in said third clamp section for securance of said clamp sections together.

6. The clamp section of claim 10 in which said circumferentially-extending portion of the arm has detent means defined thereon, and said shelf extends to said first side of the section, and said slot is open to said first side, said clamp section having walls defining a rear slot defined about the same circumference as said first-named slot and spaced therefrom for receiving the tip of an arm passing out of a corresponding slot of said second clamp section, and a second shelf overlying said rear slot which is of different thickness than said first named shelf, whereby a step is formed between the two shelves of identically shaped clamp sections in clamp half-forming relation, to be releasably grasped by said detent means on the arm of a third clamp section.

7. The clamp section of claim 6 in which said arm is carried by said second shelf, and said second shelf is of less thickness than said first named shelf.

8. The clamp of claim 2 in which each clamp half defines an annular sealing flange about the axis of said bore and tubing held therein, said sealing flange being positioned to face axially of said bore and tubing to press against a radially inward portion of a tubing flange mounted in said clamp half, to bias said tubing flange against an abutting tubing flange in end-to-end relationship therewith.

9. The clamp section of claim 3 in which a sealing flange is defined adjacent said bore portion, said flange being positioned to face axially of said bore portion and tubing held therein, to press against a radially inward portion of a tubing flange mounted in said bore portion, to bias said tubing flange against an abutting tubing flange when mounted in end-to-end relationship therewith.

10. The clamp section of claim 5 in which a sealing flange is defined adjacent said bore portion, said flange being positioned to face axially of said bore portion and tubing held therein, to press against a radially inward portion of a tubing flange mounted in said bore portion, to bias said tubing flange against an abutting tubing flange when mounted in end-to-end relationship therewith.

11. A separable clamp section for assembling into a clamp for securely holding ends of tubing having flanged ends together in end-to-end relationship to form a continuous bore through said tubing ends, which clamp section comprises:
- a body which defines on a first side thereof a portion of a bore to receive said tubing, said bore portion having an enlarged portion to receive a tubing flange, said enlarged portion extending to an adjacent side of said body;
- means located adjacent said first side for releasable locking together with a second clamp section to define a clamp half with a complete bore for receiving and holding said tubing and flange therein, and
- walls defining a slot in said adjacent side of the body, said walls including a shelf overlying a portion of said slot;
- an arm extending from said adjacent side, said arm and shelf being each positioned for engagement with an arm and a shelf respectively of a third clamp section for releasable securance thereto, said arm, slot, and shelf being circumferentially disposed about the longitudinal axis of said bore, said arm having a circumferentially extending portion proportioned to fit into a slot of said third clamp section, and by relative rotation to pass under a shelf overlying a slot in said third clamp section for securance of said clamp sections together, said circumferentially extending portion of the arm having detent means defined thereon, and said shelf extending to said first side of the clamp section, said slot being open to said first side,
- said clamp section also having walls defining a rear slot defined about essentially the same circumference as said first named slot and spaced therefrom for receiving the tip of an arm passing out of a corresponding slot of said second clamp section, and a second shelf overlying said rear slot which is of different thickness than said first named shelf, whereby a step can be formed between two shelves of separable clamp sections in clamp half-forming relation, to be releasably grasped by said detent means on the arm of a third clamp section.

12. The clamp section of claim 11 in which said arm is carried by said second shelf, and said second shelf is of less thickness than said first named shelf.

* * * * *